P. M. MARKO.
STORAGE BATTERY.
APPLICATION FILED MAY 2, 1919.
1,420,435.
Patented June 20, 1922.
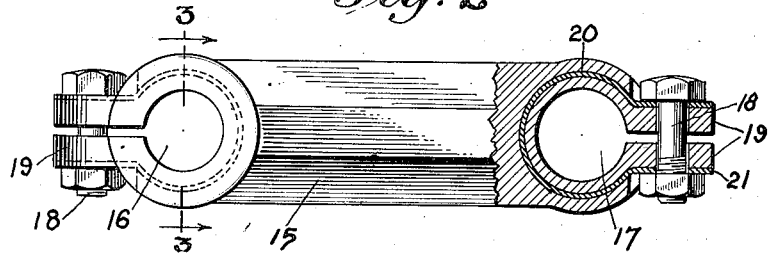
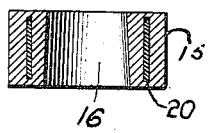
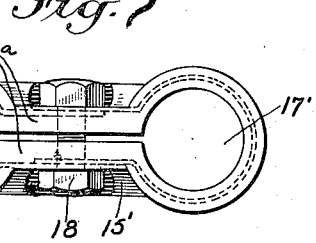
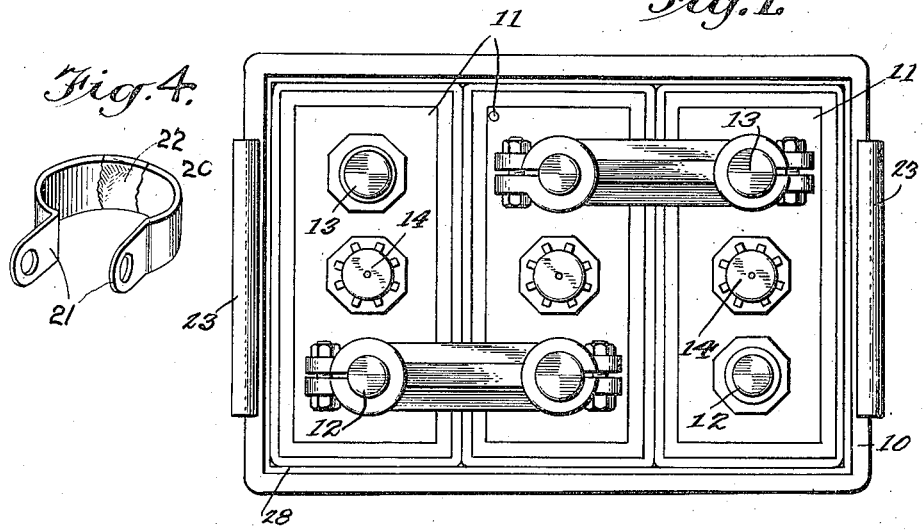
WITNESSES
INVENTOR
Paul M. Marko
BY
ATTORNEYS

UNITED STATES PATENT OFFICE.

PAUL M. MARKO, OF BROOKLYN, NEW YORK.

STORAGE BATTERY.

1,420,435.  Specification of Letters Patent.  Patented June 20, 1922.

Application filed May 2, 1919. Serial No. 294,250.

*To all whom it may concern:*

Be it known that I, PAUL M. MARKO, a citizen of the United States, and a resident of the city of New York, borough of Brooklyn, in the county of Kings and State of New York, have invented a new and Improved Storage Battery, of which the following is a full, clear, and exact description.

This invention relates to storage batteries and has particular reference to details of construction whereby batteries of this character are rendered more reliable and efficient than batteries otherwise constructed.

Among the objects for the invention is to construct a battery with means for easily removing any of the cells for inspection, examination, repair or interchange.

Another object of the invention is to provide means whereby it is practically impossible for the several cells to be connected except in a proper positive to negative manner.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a plan view of a three cell battery illustrating my improvement.

Fig. 2 is an enlarged plan view of one form of connector, a portion of which is shown in horizontal section.

Fig. 3 is a vertical transverse section on the line 3—3 of Fig. 3.

Fig. 4 is a detail perspective view of a reinforcement clip such as used by connectors, and Fig. 5 is a plan view of a modified form of connecter.

Referring now more specifically to the drawings I show in Fig. 1 a battery comprising a box 10 having fitted therein for independent removability a battery of three cells 11 which are preferably all of the same type and each having positive and negative binding posts 12 and 13 respectively, the latter being preferably larger in diameter than the former, and all of the binding posts being preferably of smooth tapered cr frusto-conical form. Each cell furthermore is provided with a removable inspection cap or plug 14. The details of construction of the individual cells and their covers are covered by my co-pending application of even date herewith, Serial No. 294,249, and hence I make no claim per se for the battery cells in this case. Obviously the number of cells may be greater or less than that shown and may be arranged in the box in any suitable manner. By making the terminal posts 12 and 13 of each cell of different diameters and similar binding posts of all cells exactly alike it is an impossibility for any cell to be connected to an adjacent cell except in the proper positive to negative manner.

One of the principal features of this battery therefore lies in the means for connecting adjacent cells. As shown in Figs. 1 and 2 my improved connectors comprise a bar 15 having at its opposite ends a pair of clamps 16 and 17, the eyes or openings of which have a form, taper and size corresponding to the ends of the positive and negative posts respectively of the several cells. In other words the eye or opening 16 fits the post 12 while the other eye fits only the post 13 of an adjacent cell and the connection cannot be made otherwise, assuming of course that the cells are to be connected in series in accordance with the usual practice. The bars 15 are usually made of lead or other metal having a low degree of flexibility or strength, and hence the clamping bolts 18, or their equivalent, co-operating with the several clamps have a tendency to break the lug or ear portions 19 of the clamps under ordinary conditions. In order to obviate this difficulty I reinforce the clamps by means of clips or straps 20 which are cast or molded in the clamp ends of the connector. As shown clearly in Fig. 2, the loop portion of the clip being entirely embedded in the end of the bar is surrounded upon all sides with the metal thereof, while the end or tab portions 21 of the clip lie on the outside of the lugs 19 and against which the head and nut portions of the clamping bolts have direct bearing. By tinning or otherwise coating the clips as indicated at 22, the coating however covering the entire clip, prior to the insertion into the mold the metal of the clips which may be of any suitable tough strong material such as brass, copper or the like, will be made in effect homogeneous with the lead in the completed connector. This reinforcement strap or clip 20 at either end of the connector prevents in practice the likelihood of the breakage of any part of the clamp even when put under maximum compression.

In Fig. 5 the connector 15' is formed with terminal post openings or eyes 16' and 17' for co-operation with suitably spaced positive and negative terminals on adjacent cells, but the clamping in this form of connector is effected by means of a single bolt 18, or its equivalent, passing centrally and transversely through the connector between the eyes whereby the two bar portions 15ᵃ composing that part of the connector between the eyes are drawn bodily toward each other. The reinforcement means in this form of the invention is substantially the same as above described, but the tab portions of the reinforcement clips overlap each other so that the same binding bolt passes through all four of such tabs. The loop portions of the binder straps or clips as above described are embedded in the soft metal while the tab portions are exposed for direct contact with the head and nut portions of the binding bolt. Handles 23 are provided at the ends of the box 10.

I claim:

1. In storage battery cell connectors, a connector bar of metal, the ends of the bar constituting clamps and reinforcement means to strengthen the clamp portions of the bar and having tabs disposed at the outer faces of the bar, said reinforcement means comprising bow-shaped clips embedded in the metal of the bar and having exposed tabs, and binding means passing through the bar and exposed portions of the clips, the binding means having direct contact with said exposed portions of the clips.

2. The herein described cell connector for storage batteries comprising a bar of base metal having attachment eyes for engagement with binding posts, a reinforcement clip having a loop portion embedded in the metal around each eye and terminating in exposed tabs, and binding means passing transversely through the bar and co-operating directly with said tabs, substantially as set forth.

3. In a connector for storage battery cells, a bar made of heavy base metal and having eyes at its remote portions for engagement with the binding posts, each eye portion being embraced by a reinforcing clip of flexible metal of greater tensile strength than the bar and having tabs disposed at the outer faces of the bar, and binding means passing through the bar and portions of said reinforcing clips and in contact with the latter, said tabs or clips being tinned or otherwise suitably coated.

PAUL M. MARKO.